United States Patent [19]
Boyovich et al.

[11] Patent Number: 5,811,738
[45] Date of Patent: Sep. 22, 1998

[54] TRUNNION-MOUNTED WEIGHT MEASUREMENT APPARATUS

[75] Inventors: Richard A. Boyovich, Kent, Wash.; Larry D. Santi, 5045 NE. 23$^{rd}$ St., Renton, Wash. 98059-4128

[73] Assignee: Larry D. Santi, Renton, Wash.

[21] Appl. No.: 758,283

[22] Filed: Nov. 8, 1996

[51] Int. Cl.$^6$ ................................................ G01G 19/08
[52] U.S. Cl. .......................... 177/136; 177/137; 177/211
[58] Field of Search .................................... 177/136, 137, 177/138, 211

[56] References Cited

U.S. PATENT DOCUMENTS

| | | | |
|---|---|---|---|
| Re. 35,301 | 7/1996 | Reichow | 177/136 |
| 3,565,196 | 2/1971 | Laimins et al. | 177/211 |
| 3,602,866 | 8/1971 | Saxl | 338/5 |
| 3,603,418 | 9/1971 | Schmidt et al. | 177/136 |
| 3,650,340 | 3/1972 | Bradley | 177/136 |
| 3,661,220 | 5/1972 | Harris | 177/136 |
| 3,734,216 | 5/1973 | Nordstrom et al. | 177/136 |
| 3,854,540 | 12/1974 | Holmstrom, Jr. | 177/136 |
| 3,935,915 | 2/1976 | Seilly et al. | 177/136 |
| 3,990,032 | 11/1976 | Fish et al. | 338/5 |
| 4,042,049 | 8/1977 | Reichow et al. | 177/137 |
| 4,249,623 | 2/1981 | McCauley | 177/136 |
| 4,287,958 | 9/1981 | Schmidt | 177/136 |
| 4,364,279 | 12/1982 | Stern et al. | 73/862.66 |
| 4,420,985 | 12/1983 | Raskin | 73/862.66 |
| 4,581,948 | 4/1986 | Reichow | 73/862.65 |
| 4,666,003 | 5/1987 | Reichow | 177/136 |
| 4,673,047 | 6/1987 | Harbour | 177/136 |
| 5,007,042 | 4/1991 | Santi | 370/9 |

OTHER PUBLICATIONS

Advertisement of Structural Instrumentation, Inc., Seattle, Washington, for Load Cells,*Log Trucker*, Oct. 1996.

H–900 Single Point Suspension Series Configurations & Parts Identification catalog, Hutchens Industries, Springfield, Missouri, Apr. 1996 (17 pages).

21 photographs of prior art devices, dated on or about Aug. 15, 1995.

Drawing indicating truck types on which a weight measurement device may be installed, Moro Motors, Inc., Warren, Arkansas, Jun. 9, 1995 (best copy available).

Product brochure of Structural Instrumentation, Inc., Seattle, Washington, for Payload Management Systems, Jun. 1995.

Metrox Products, Load Pins—The Easy, Accurate Way to Measure Load, Force, and Tension for Any Application (Handbook & Product Catalog), M/D TOTCO Instrumentation, Cedar Park, Texas, 1994.

*Primary Examiner*—Hezron E. Williams
*Assistant Examiner*—Randy W. Gibson
*Attorney, Agent, or Firm*—Seed and Berry LLP

[57] ABSTRACT

A weight measurement apparatus of the type for determining the weight of a load placed on a wheeled vehicle. The apparatus is releasably connectable to the vehicle at a location between the axles of the vehicle, which retain the wheels, and the portion of the vehicle retaining the load. The apparatus includes strain gages for calculating the stress in the device created by the load, a decoder for converting the stress measurement to a weight value, and an onboard display device for displaying the weight of the load to the vehicle operator. The apparatus may be sized and shaped to retrofit existing structural components in the suspension system of a truck, thereby adding a weight measurement capability to the vehicle.

35 Claims, 5 Drawing Sheets

TRUNNION-MOUNTED WEIGHT MEASUREMENT APPARATUS

TECHNICAL FIELD

The present invention is directed toward an apparatus and method for measuring the weight of a truck trailer and payload.

BACKGROUND OF THE INVENTION

Operators of trucks driven on public highways must typically monitor the weight of the truck payloads to remain in compliance with the legal load limits and avoid paying substantial fines associated with violating such limits. Monitoring the payload weight is often a difficult task when the payload is placed upon the truck at a remote location, such as a logging site, construction site, gravel pit, or other location where truck scales are not easily accessible. In these situations, it is desirable to have an onboard means for measuring the weight of the payload placed upon the truck or a trailer towed behind the truck.

Figure 1:
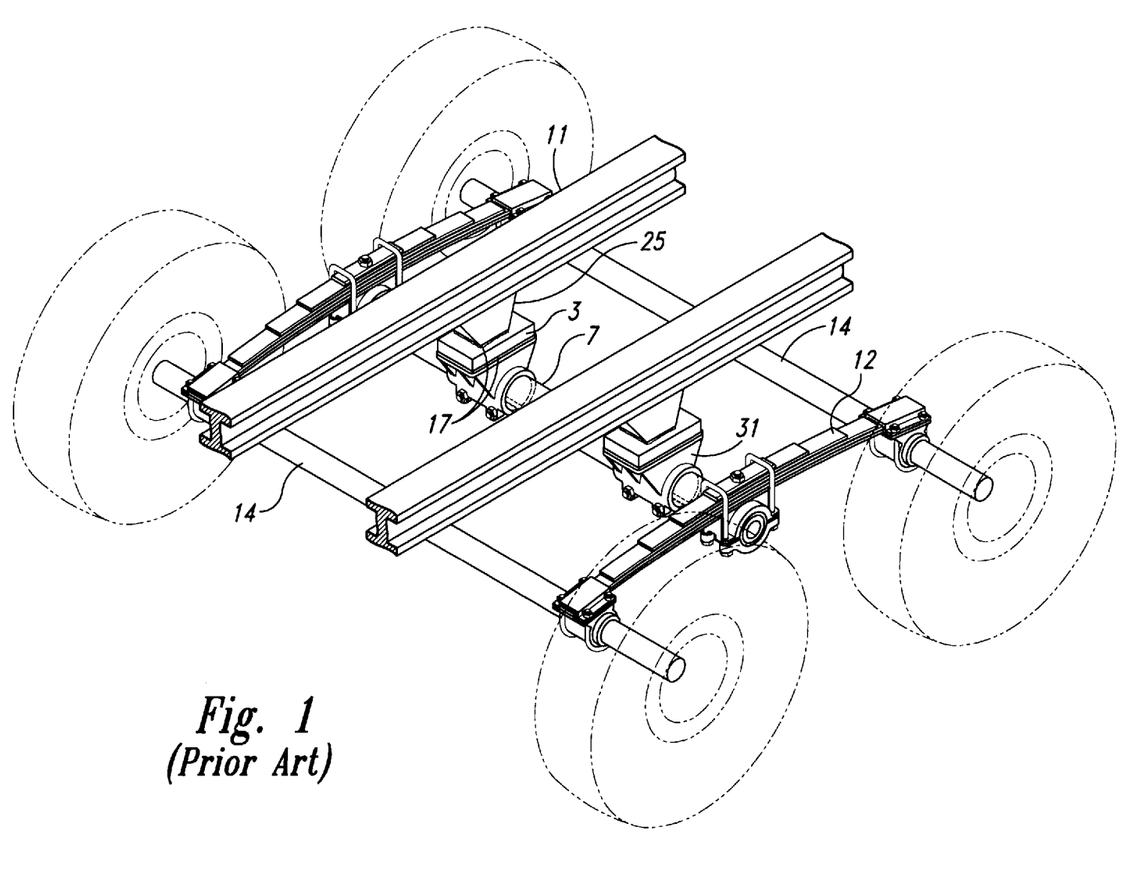
FIG. 1 is an isometric view of a prior art truck trailer weight measurement device.

Various devices have previously been used to measure the weight of a payload placed upon a truck trailer. Such devices include a single point suspension scale 3, such as the one illustrated in FIG. 1. The scale may take the form of a bending beam load cell or a double-ended shear beam load cell. As shown in FIG. 1, the scale 3 is typically mounted between a frame attachment member 25 which extends downwardly from the trailer frame 11, and a frame mounting bracket 31. The frame mounting bracket 31 is attached to a conventional trunnion tube 7 which retains springs 12 and axles 14. One drawback with these scales is that they often must be welded directly to the trailer frame attachment member 25 and to the frame mounting bracket 31 at weld joints 17. The weld joints 17 are subjected to high stress as a result of the payload weight and harsh environmental conditions, such as mud, rain, sleet, and ice. As a result, the welded joints 17 tend to fail, putting the trailer out of service. The failed joints must be repaired before the trailer may be returned to service, an expensive operation made more expensive if the failure occurs in a remote environment.

A further drawback of these prior art scales is that, due to high torsional forces induced by frame bending and twisting, it has been difficult to design scales that ignore these false torsional forces and instead respond only to the vertical load force. For example, experience has indicated that simply driving the vehicle to another spot on the road has caused the scales to report a false zero shift in signal output due to torsional forces induced by the frame of the vehicle, resulting in an erroneous weight measurement. Further, these types of scales have been found to be quite sensitive to off level loading conditions. For example, if the vehicle is loaded while being positioned on a 5 to 15 degree slope, the accuracy of the weight measurement degenerates.

Another drawback of these prior art scales is that they are interposed between the trailer frame and the conventional trunnion tube 7, raising the frame above the trunnion tube. In order to avoid increasing the overall height of the trailer, a frame retro-fitted with such a scale must be shortened in the region of the scale to accommodate installation of the scale. This requires cutting the frame attachment member 25, to remove the required material. This is not only an expensive and time-consuming operation but also degrades the structural integrity of the vehicle. The operation is necessary if the scale is to be welded in place, as shown in FIG. 1, and is also necessary if the scale is a replaceable unit. For example, if the scale is to be bolted to the frame attachment member 25 and the frame mounting bracket 31, material must still be removed from the attachment member and/or the mounting bracket, and mounting plates sized to receive the scale mounting bolts must be welded in place. Whether the scale is replaceable or non-replaceable, it is difficult for truck owners to accept the fact that cutting critical suspension support members of the vehicle is required for these types of onboard scale installations.

A further drawback of the present scales is that in the event of a failure of the scale itself, the scale is not easily replaceable in the field. Because the scale 3 is welded to the trailer frame attachment member 25 and to the frame mounting brackets 31, replacement of the scale requires breaking the welded joints 17 between the scale and the frame attachment member, and between the scale and the frame mounting bracket 31, and re-welding a new scale to both the frame attachment member and the frame mounting bracket. Such operations are expensive and time consuming and particularly difficult if performed in the field.

Accordingly, there is a need for an onboard truck or payload weight measurement device which does not suffer from the problems associated with existing devices. The present invention fulfills this need and provides further related advantages.

SUMMARY OF THE INVENTION

In brief, the present invention provides an apparatus for measuring the weight of a load borne by an axle or multiple axles comprising an axle group. The apparatus is designed to replace the components typically used to mount the axle or axles to a load-bearing vehicle such as a truck trailer. The apparatus is designed to be removable for purposes of maintenance, replacement and retrofitting.

In one embodiment of the present invention, the device includes a trunnion member which extends between opposing portions of the axle or axles. The trunnion member is removably coupled at opposing ends to the opposing ends of the axle. The trunnion member is also coupled at a connection location between the ends of the axle to the load. The trunnion member has first and second stress concentration grooves positioned between the connection location and the first and second ends of the axle, respectively. The stress concentration grooves concentrate the stress borne by the trunnion member in selected locations of the trunnion member. A plurality of strain gages are rigidly attached to the trunnion member at the selected locations. The strain gages measure a strain of the trunnion member at the selected locations and transmit a signal corresponding to the measured strain.

In a further aspect of this embodiment, the weight measurement device includes a decoder coupled to the strain gages and capable of receiving the strain measurement signal from the strain gages and converting the strain measurement signal to a digital signal representing the weight of the load borne by the trunnion member. The digital signal is conveyed to a display mechanism coupled to the decoder. The display mechanism displays the weight of the load borne by the axle to a user.

In one embodiment of the invention, the trunnion member is a double-ended shear beam pin load cell which is sized and shaped to replace a conventional trunnion tube such as is typically included in a factory-built truck trailer and suspension system.

The invention also provides a method for determining the weight of a load borne by a trailer. The method comprises removing an existing trunnion tube from the trailer, connecting a trunnion member modified to be a load-indicating trunnion member in its place, the load-indicating trunnion member having strain gages positioned therein for calculating the weight of the load, calculating the weight of the load from a signal generated by the strain gages, and displaying the weight of the load to a user.

These and other aspects of this invention will become evident upon reference to the following detailed description and attached drawings.

DETAILED DESCRIPTION OF THE INVENTION

Figure 2:
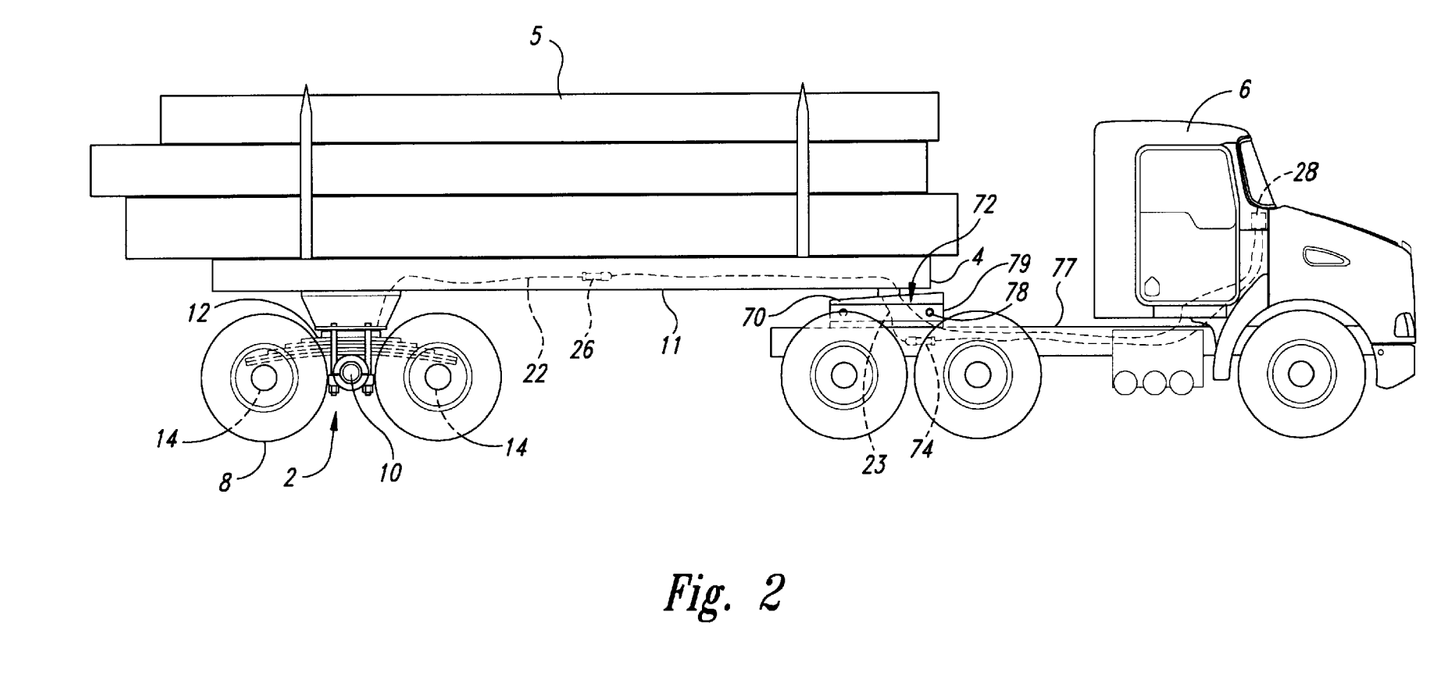
FIG. 2 is a side view of a typical truck and trailer upon which is mounted a weight measurement device in accordance with one embodiment of the present invention.

As discussed above, the present invention is directed toward an onboard apparatus for measuring the weight of a truck trailer and its payload. In the preferred embodiments illustrated herein, a weight measurement apparatus 2 measures the weight transmitted by a trailer 4 and its payload 5 to the rear axles 14, as seen in FIG. 2. A second weight measurement is preferably taken at a fifth wheel 70 by a fifth wheel mounting table 72 having replaceable load pins 78. These two measurements are transmitted to an onboard display 28 in the tractor 6 cab where they are combined to produce and display the payload weight, allowing the driver to read the trailer payload and avoid overloading the trailer in the field.

The weight measurement apparatus 2 is preferably removably connected to both the trailer frame 11 and the axles 14 to allow for convenient replacement of the weight measurement apparatus 2 in the event that replacement becomes necessary. The weight measurement apparatus is also preferably sized and shaped to replace a conventional trunnion tube 7 (see FIG. 1), so that the apparatus may be conveniently retrofitted to an existing truck trailer.

A representative weight measurement apparatus 2 in accordance with a preferred embodiment of the present invention is shown in the figures for purposes of illustration. As shown in FIG. 2, the weight measurement apparatus 2 is installed on a trailer adapted to carry a payload 5 of logs; however, the weight measurement apparatus 2 may be installed on any typical trailer, or directly on the tractor 6 if the tractor carries the payload.

Figure 3:
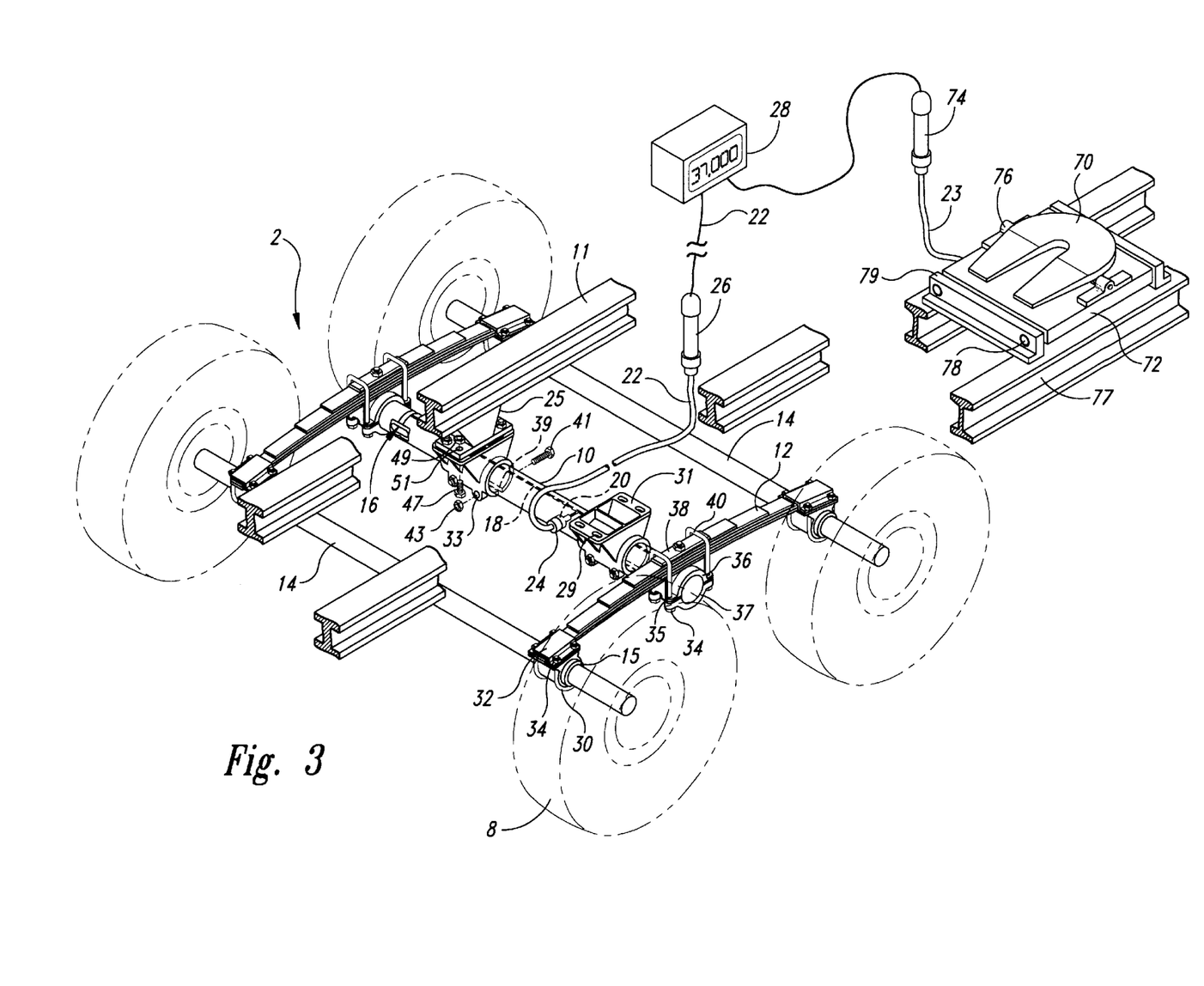
FIG. 3 is an isometric view of a trunnion-mounted weight measurement device in accordance with a preferred embodiment of the present invention mounted to a twin axle suspension system of a truck trailer.

As shown in FIGS. 2 and 3, rear wheels 8 are suspended from the trailer 4 with suspension members 12. In a preferred embodiment, the suspension members 12 are conventional leaf springs, as illustrated. The rear wheels 8 are connected to axles 14 which are rotatably retained by the suspension members 12. The suspension members 12 are connected to a trunnion member 10 which extends between the leaf springs and is in turn connected to the trailer frame 11. The suspension members 12 absorb shocks encountered by the wheels 8 thereby protecting the payload 5 which rests on the trailer frame 11.

Figure 4:
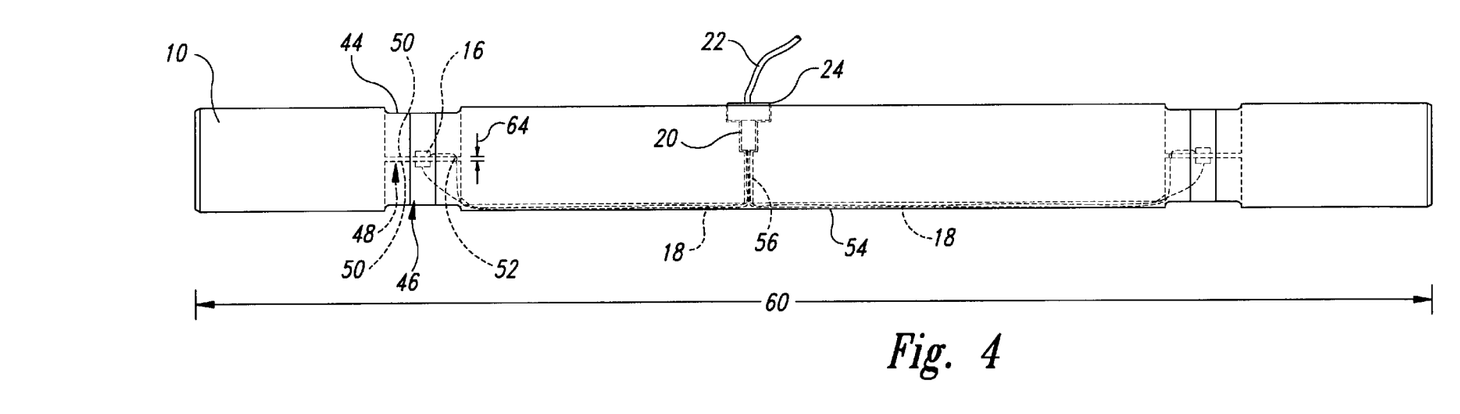
FIG. 4 is a detailed top view of the trunnion member of the preferred embodiment illustrated in FIG. 3.
Figures 5, 6:
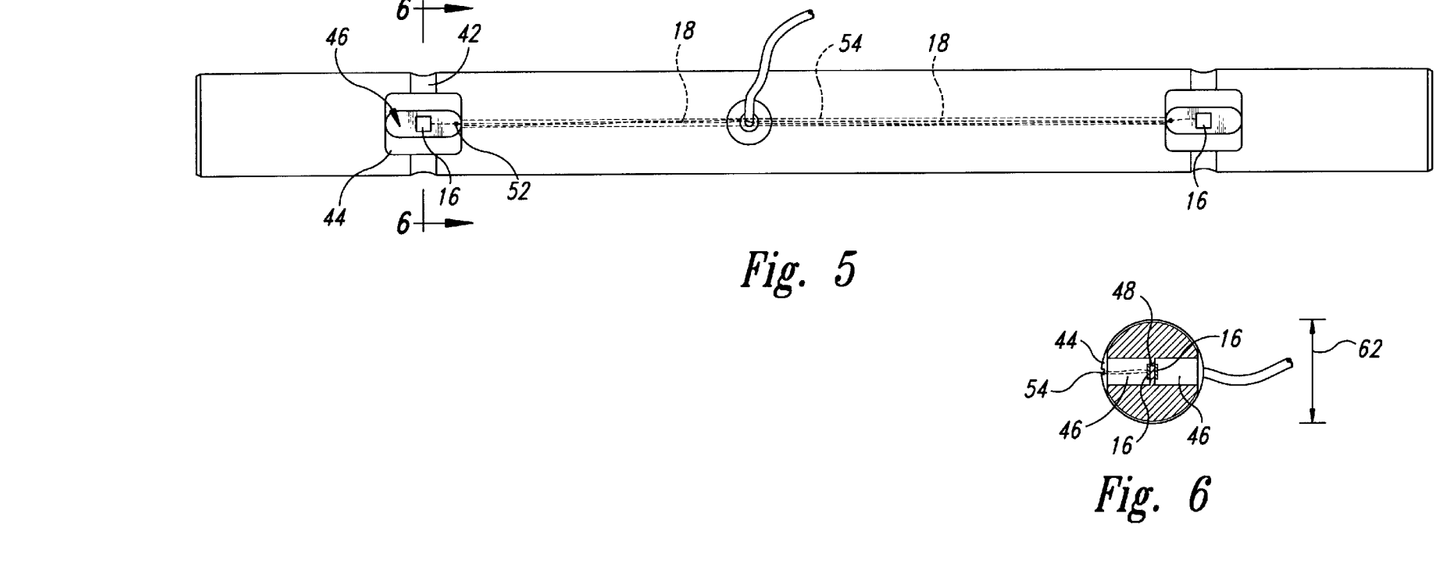
FIG. 5 is a detailed side view of the trunnion member of the preferred embodiment illustrated in FIG. 3.
FIG. 6 is a cross-sectional view of the trunnion member of FIGS. 4 and 5 taken substantially along line 6—6 of FIG. 5.

As shown generally in FIG. 3 and in greater detail in FIGS. 4 through 6, the trunnion member 10 contains strain gages 16, which produce an analog signal indicating the weight of the trailer 4 and payload 5 borne by the wheels 8. Leads 18 extend from the strain gages 16 to a connecting block 20. A cable 22 with a connector 24 is releasably connected to the connecting block 20 and transmits the strain gage signal to a decoder 26. The decoder 26 produces a digital axle weight signal and transmits the axle weight signal to a digital display unit 28 located in the tractor 6. Pin load sensors 78, which are mounted to the fifth wheel mounting table 72, generate a fifth wheel weight signal which is transmitted to the fifth wheel decoder 74. The fifth wheel decoder 74 produces a digital fifth wheel weight signal which is transmitted to the digital display 28 where it is combined with the digital axle weight signal to produce a total vehicle weight.

In a typical installation shown in FIG. 3, the axles 14 are housed in axle seats 15. Although two axles 14 are shown in the figures for purposes of illustration, the present invention may easily be installed on vehicles having more or fewer axles, as will be apparent to those skilled in the art. The axle seats 15 permit the axle to rotate but are themselves rigidly mounted to the suspension members 12. As shown in FIG. 3, the axle seats 15 are mounted to the suspension members 12 with u-bolts 30 connected to mounting plates 32 with nuts 34, although other mounting methods are possible, as will be apparent to those skilled in the art. In the embodiment illustrated in FIG. 3, the axles are positioned beneath the suspension members 12 but they may also be placed above the suspension members.

The suspension members 12 are removably connected to the trunnion member 10 with trunnion u-bolts 40 and nuts 34. The trunnion u-bolts 40 are mounted over a top plate 38 positioned above the suspension member 12. The trunnion u-bolts 40 pass through holes 35 in a trunnion upper hub 36 and a trunnion lower hub 37. Nuts 34 are threaded to lower threaded portions of the u-bolts 40 to clamp the top plate 38, the suspension member 12, the trunnion upper hub 36 and the trunnion lower hub 37 around the trunnion member 10, clamping the trunnion member to the suspension member. Although the trunnion member 10 is shown mounted beneath the suspension member 12 in FIG. 2, other embodiments in which the trunnion member is mounted above the suspension member are possible as well.

The trunnion member 10 is releasably connected to the trailer frame 11 with frame mounting brackets 31 and frame attachment members 25. The frame mounting bracket 31 is split along a split line 39 on its lower edge and has mounting holes 33 positioned on opposing sides of the split line. Bolts 41 pass through the holes 33 on opposing sides of the split line 39 and are threadably connected to nuts 43 to clamp the trunnion member 10 to the frame mounting bracket 31. The frame mounting bracket 31 is then releasably connected to the frame attachment member 25 by frame bolts 47 which pass through holes 29 in the frame mounting bracket and holes 51 on the frame attachment member. Nuts 49 are threadably connected to the bolts 47 to secure the frame mounting bracket 31 to the frame attachment member 25.

Figure 7:
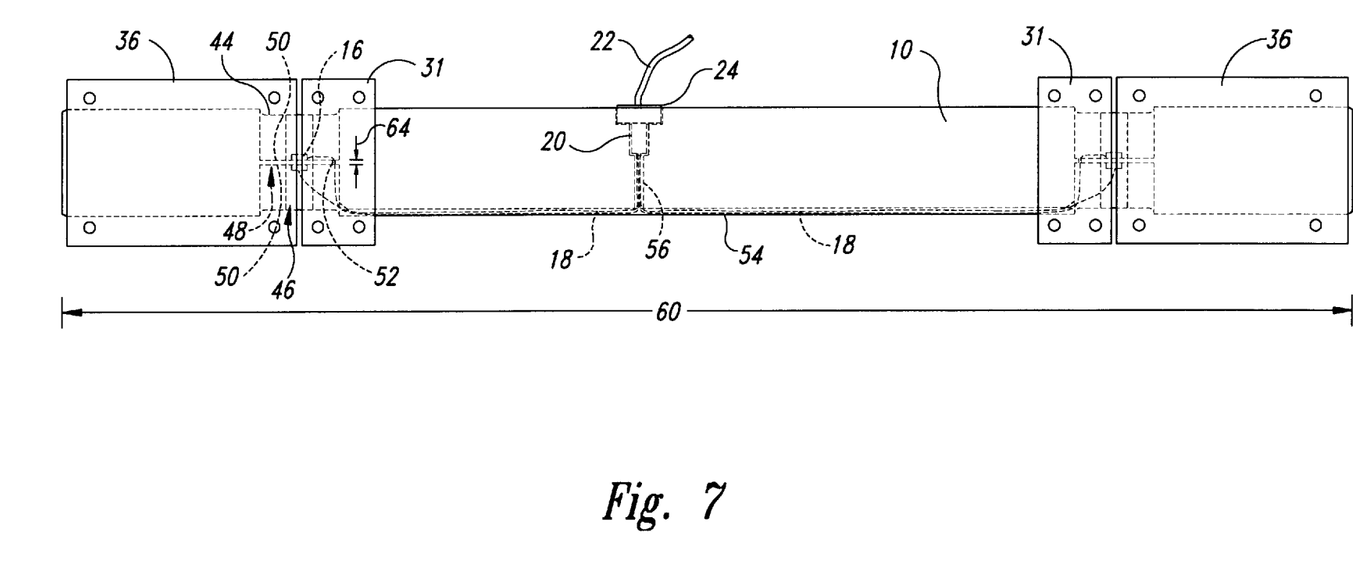
FIG. 7 is a top view of the trunnion member of the embodiment illustrated in FIG. 3, indicating the mounting positions of frame mounting brackets and trunnion hubs on the trunnion member.

The frame mounting bracket 31 is shown spaced a substantial distance from the trunnion upper hub 36 and lower hub 37 for purposes of illustration. In actual installation, the frame mounting bracket 31 is spaced approximately 1/16" from the trunnion hubs 36 and 37 as indicated in FIG. 7.

An important aspect of the preferred embodiment of the present invention illustrated herein is that the trunnion member 10 is releasably coupled to both the frame members 11 and the suspension members 12. The releasable couplings allow the trunnion member to be easily replaced if necessary, in an operation which can be conducted in the field. Although the trunnion member 10 is connected to the frame members 11 and suspension members 12 with bolts, nuts and mounting plates in the illustrated embodiment, other mounting methods which permit quick release and reattachment are possible, as will be apparent to those skilled in the art. As shown in FIG. 3, the trunnion member 10 has a substantially cylindrical external shape for mounting with the mounting hardware discussed above. Therefore, in alternate embodiments, the trunnion member 10 may be mounted with any mounting hardware adapted to retain a cylindrical shape.

In further alternate embodiments of the present invention, the trunnion member 10 has non-cylindrical shapes. For example, the trunnion member 10 may have a rectangular rather than circular cross-sectional shape. In these embodiments, the trunnion member 10 may be mounted with any mounting hardware adapted to retain the selected cross-sectional shape of the trunnion member.

In a typical factory installation a trailer is supplied with a conventional trunnion tube 7 (FIG. 1) which is hollow and cylindrical in shape. In the preferred embodiment of the present invention illustrated herein, the trunnion member 10 has been adapted to produce a weight measurement signal. However, the overall dimensions of the trunnion member 10 are commensurate with the factory installed trunnion tube 7 to allow for convenient retrofitting. As discussed above, the trunnion member 10 may be used with any trailer having hardware adapted to retain a conventional trunnion member 7.

The details of the trunnion member 10 are best seen in FIGS. 4 through 6. In a preferred embodiment, the trunnion member 10 is a double-ended shear beam pin load cell, such as is disclosed in U.S. Pat. No. 4,364,279. Load devices of this type are known in the art and available in custom dimensions from various manufacturers, including M/D TOTCO™ of Cedar Park, Tex., Weighst Systems, Inc. of Kent, Wash., and Transducer Technologies, Inc. of Temeculah, Calif. As illustrated in the top view of FIG. 4 and the side view of FIG. 5, the trunnion member 10 is generally cylindrical and solid and has circumferential grooves 42 and flat regions 44 located at each end. The grooves 42 serve to concentrate the stress borne by the trunnion member 10 in the end regions of the trunnion member where the strain gages 16 are installed. The flat regions 44 provide a locally flat portion of the otherwise cylindrical trunnion member 10 which improves the uniformity of the stress concentrated in the end regions of the trunnion member.

As best seen in FIGS. 4 through 6, two elongated slots 46 partially penetrate the trunnion member 10 at each end leaving webs 48 intact. The elongated slots 46 are positioned such that the stress concentrated by the grooves 42 is easily measured at the webs 48. Strain gages 16 are mounted to opposing surfaces 50 of each web to measure the shear force at the webs. The electrical signals generated by the strain gages are transmitted by leads 18 which are routed through a groove 54 in the side of the trunnion member 10 and through an access hole 56 penetrating the trunnion member and are connected to the connector block 20. Holes 52 pass completely through the webs 48 and are sized to permit the leads 18 to pass from one side of the web 48 to the other. The holes 52 permit the leads 18 to pass from the strain gages 16, through the holes 52 in the webs 48, to the groove 54. The connector 24 with cable 22 is releasably attached to the connector block 20 and transmits the strain gage signals to the decoder 26, as discussed previously. The connector 24 and connector block 20 may be any of a variety of sealable, quick release connector combinations known in the art.

The strain gages 16 are typically placed in an area of the beam where there is little bending action and where the shear forces are concentrated as a result of the groove 42 and uniform as a result of the flat regions 44. What bending forces there are would typically be cancelled by the use of a bridge circuit so that the resulting force measured by the strain gages is substantially a shear force only. The use of such circuits is well known in the art. The shear forces measured at each web 48 are added to calculate the total weight borne by the trunnion member 10. The shear forces at the webs 48 may be the same or may be different. For example, when the load 5 is centered between the wheels 8 located on opposite sides of the trailer 4, the shear force present in each web 48 is equal to half the load borne by the trunnion member 10. When the load 5 is located off-center, the shear forces in each web differ; however, this does not affect the accuracy of the shear force measurement or the accuracy of the calculated weight borne by the trunnion member.

The strain gages 16 must be in intimate contact with the web surfaces 50 in order to accurately measure the local shear force. Typically, the gages are adhesively bonded to the web surfaces 50 using high strength adhesives such as Mbond 610, a heat cured epoxy adhesive supplied by Measurements Group, Inc. of Raleigh, N.C. Other high strength adhesives and other mounting methods which produce the required intimate contact are possible as well. Once the strain gages 16 are installed, the slots 46 and the groove 54 may be filled in with potting material to protect the strain gages 16 and leads 18 from environmental hazards such as chemicals, dirt and moisture. Typically, wax and/or polyurethane is applied directly to the strain gages 16 to seal them from moisture, and polysulfide is used to fill in the remainder of the slots 46 and groove 54. Other suitable potting materials known to those skilled in the art are possible as well.

In operation, the trunnion member 10 replaces an existing conventional trunnion member or may be installed during manufacture of the trailer 4 and associated suspension elements. The trunnion member 10 is positioned so that the frame attachment members 25 are attached to the trunnion member at locations inward from the grooves 42 and the trunnion hubs 36 and 37 are mounted outward of the grooves 42. The attachment member 25 and trunnion hubs 36 and 37 are separated by a gap of approximately 1/16" and the gap is centered over the circumferential groove 42. In this manner, the load borne by the trunnion member 10 is positioned between the supports provided by the leaf springs 12, axles 14 and wheels 8. When the trunnion member 10 is subjected to a stress, for example, as when payload 5 is loaded on the trailer 4, the trunnion member flexes and the stress in the trunnion member is concentrated at the webs 48. The strain gages 16 generate an electrical signal which is proportional to the stress and transmit the signal to the decoder 26. The decoder 26 produces a digital signal from the analog electrical signal received from the strain gages 16, and transmits the signal to the digital display 28.

Although the embodiment illustrated in FIG. 2 shows the axles 14 mounted to the trunnion tube 10 outward of the grooves 42 and the frame members 11 mounted to the tube inward of the grooves 42, other embodiments are possible as well, so long as the shear forces present in the webs 48 accurately represent the load borne by the trunnion member 10. For example, the mounting positions of the frame attachment members 25 and axles 14 to the trunnion member 10 may be reversed so that the frame attachment members are mounted outward of the grooves 42 and the axles are mounted inward of the grooves 42. In this manner, the weight of the payload is cantilevered on the ends of the trunnion tube 10. Such an installation will not affect the accuracy of the resulting weight measurement.

In a preferred embodiment the trunnion member 10 is a commercially available load cell or load pin as discussed previously. The load pins are available in custom sizes for replacing or retrofitting conventional trunnion members. For example, the trunnion member 10 illustrated in the figures has an overall length 60 of 48 inches and a diameter 62 of 4 inches, for installation on a typical heavy duty, twin axle trailer. The web members 48 have a thickness 64 of 0.250 inches and are suitable for installation on vehicles having a gross weight of approximately 85,000 pounds and a payload weight of approximately 60,000 pounds. However, the invention is not so limited and other load cell sizes for installation on load-bearing vehicles having greater or lesser gross weights and capacities are possible as well.

As illustrated in FIG. 2, the fifth wheel releasably retains a connection portion of the trailer 4, permitting the tractor 6 to pull the trailer as well as bear a portion of the trailer weight. As shown in FIG. 3, the fifth wheel 70 is pivotably mounted to doughnuts 76 which are in turn mounted to the fifth wheel mounting plate 72. The fifth wheel mounting plate 72 contains pin load cell members 78 which project outwardly therefrom and which operate in a fashion similar to the trunnion member 10. The pin load cell members 78 are positioned such that the ends of the pin load cell members projecting from the fifth wheel mounting plate 72 are connected to plate mounting brackets 79 which are in turn welded to the tractor frame 77. In this manner, the load borne by the fifth wheel 70 and the fifth wheel mounting plate 72 is suspended between the plate mounting brackets 79 by the pin load cell members 78. Strain gages located in the pin load cell members 78 transmit a stress signal to the fifth wheel decoder 74, the signal representing the weight placed upon the fifth wheel 70 by the trailer 4. The fifth wheel decoder 74 converts the analog signal to a digital signal which is transmitted to the digital display 28 located in the tractor. The digital display computes the trailer weight based on the weight measured at the fifth wheel mounting plate 72 and the trunnion member 10, and displays the weight to the user.

In one embodiment of the invention, the decoder 26 may include digitizing and transmitting apparatus such as disclosed in U.S. Pat. No. 5,007,042 which is incorporated herein by reference. In a further embodiment, the invention includes a complete truck weight measuring system, such as the model LM150P, produced by Creative Microsystems of Renton, Wash. Such a system includes an LC6000 trunnion member, an LC100S decoder for measuring axle loads, an LC5000 mounting table and LC101D mounting table decoder for measuring fifth wheel loads and an LM100P onboard meter for integrating the calculated loads and digitally displaying the load to the user. The onboard meter is also capable of integrating the empty weight of the truck with the measured weights to produce the truck total gross weight.

Although the weight measurement device illustrated in the figures is shown mounted on a truck trailer, alternate embodiments of the invention may be mounted to any wheeled vehicle to measure the weight borne by the wheels. For example, the weight measurement device may be installed on commercial vehicles having a single unit rather than a tractor-trailer combination. Other such applications will be readily apparent to those skilled in the art.

From the foregoing it will be appreciated that, although embodiments of the invention have been described herein for purposes of illustration, various modifications may be made without deviating from the spirit and scope of the invention. Accordingly, the invention is not limited except by the following claims.

We claim:

1. A weight measurement apparatus for measuring the weight of a load borne by an axle, the axle having first and second end portions, the apparatus comprising:

a trunnion member having a length selected to extend between the first and second end portions of the axle and removably coupled at a first trunnion member end to the first end portion of the axle and at a second trunnion member end to the second end portion of the axle, the trunnion member being removably coupled to the load at at least one connection location between the first and second end portions, the trunnion member having first and second stress concentration grooves positioned between the connection location and the first and second trunnion member ends, respectively, for concentrating stress in first and second selected locations, respectively, of the trunnion member, each of the first and second stress concentration grooves having first and second spaced apart edges; and a first strain gage rigidly attached to the trunnion member at the first selected location for measuring a strain of the trunnion member at the first selected location, a second strain gage rigidly attached to the trunnion member at the second selected location for measuring a strain of the trunnion member at the second selected location, each strain gage capable of transmitting a strain measurement signal, the first strain gage being within the first and second edges of the first stress concentration groove when viewed generally normal to the first stress concentration groove, the second strain gage being within the first and second edges of the second stress concentration groove when viewed generally normal to the second stress concentration groove.

2. The weight measurement apparatus of claim 1, further comprising:

a decoder coupled to the strain gages and capable of receiving the strain measurement signals and converting the strain measurement signals to a digital signal representing the weight of the load borne by the trunnion member; and a display mechanism coupled to the decoder for displaying the digital signal to a user.

3. The weight measurement apparatus of claim 1 wherein the trunnion member is a cylindrical load cell.

4. The weight measurement apparatus of claim 1 wherein the trunnion member is a double-ended shear beam pin load cell.

5. The weight measurement apparatus of claim 1 wherein the trunnion member is sized and shaped to replace a conventional hollow cylindrical trunnion member.

6. The weight measurement apparatus of claim 1 wherein the axle has a leaf spring, the trunnion member being removably coupled to the leaf spring of the axle.

7. The weight measurement apparatus of claim 1 wherein the load includes a truck trailer, further comprising trunnion mounting members connected to the truck trailer and releasably connectable to the trunnion member.

8. The weight measurement apparatus of claim 1 wherein the load includes a truck trailer and payload and the trunnion member is releasably bolted to the truck trailer.

9. The weight measurement apparatus of claim 1, further comprising an axle mounting member coupled to the axle and releasably connectable to the trunnion member.

10. The weight measurement apparatus of claim 1 wherein the axle has a leaf spring with an upper surface, the trunnion member being removably coupled to the leaf spring of the axle and positioned above the leaf spring upper surface.

11. The weight measurement apparatus of claim 1 wherein the axle has a leaf spring with a lower surface, the trunnion member being removably coupled to the leaf spring of the axle and positioned below the leaf spring lower surface.

12. The weight measurement apparatus of claim 1 wherein the load includes a truck trailer having an empty trailer weight and a payload having a payload weight, further comprising a decoder being capable of adding the empty trailer weight to the weight represented by the strain signal to calculate a total trailer weight.

13. A weight measurement apparatus for measuring the weight of a load borne by an axle, the axle being mounted to first and second opposing and spaced-apart suspension members, the apparatus comprising:
 a hollow trunnion member having a length selected to extend between the suspension members and releasably connectable at a first end to the first suspension member and at a second end to the second suspension member, the trunnion member being releasably connectable at at least one connection location between the first and second ends to the load, the trunnion member further having a first stress concentration groove between the first end and the connection location and a second stress concentration groove between the second end and the connection location, each stress concentration groove having spaced apart edges and extending around the entire circumference of the trunnion member, the trunnion member still further having a first load sensor positioned at a first selected location for sensing a first part of the weight of the load borne by the axle and a second load sensor positioned at a second selected location for sensing a second part of the weight of the load borne by the axle, the first load sensor being positioned within the edges of the first stress concentration groove when viewed generally normal to the first stress concentration groove, the second load sensor being positioned within the edges of the second stress concentration groove when viewed generally normal to the second stress concentration groove;
 a decoder coupled to the load sensors and capable of receiving a load signal from the load sensors and converting the load signal to a digital signal representing the weight of the load borne by the axle; and
 a display mechanism coupled to the decoder for displaying the digital signal to a user.

14. The weight measurement apparatus of claim 13 wherein the load includes a truck trailer having a trunnion mounting member connected thereto, the trunnion member being releasably boltable to the trunnion mounting member and the suspension members.

15. The weight measurement apparatus of claim 13 wherein the trunnion member is a double-ended shear beam pin load cell.

16. The weight measurement apparatus of claim 13 wherein the first load sensor includes a first strain gage rigidly attached to a first web of the trunnion member and the second load sensor includes a second strain gage rigidly attached to a second web of the trunnion member.

17. A truck trailer weight measurement apparatus for measuring loads placed on a truck trailer, the truck trailer having a pair of axles mounted to first and second opposing and spaced-apart leaf springs, the apparatus comprising:
 a trunnion member having a length selected to extend between the leaf springs and releasably connectable at a first end to the first leaf spring and at a second end to the second leaf spring, the trunnion member being releasably connectable at first and second connection locations between the first and second ends thereof to a frame of the truck trailer, the trunnion member having first and second stress concentration grooves located between the connection location and the first and second ends, respectively, for concentrating stress in selected locations of the trunnion member, the first stress concentration groove being between the first end and the first connection location, the second stress concentration groove being between the second end and the second connection location;
 spring connection means for removably connecting the trunnion member to the leaf springs;
 trunnion connection means for removably connecting the trunnion member to the frame of the truck trailer;
 a plurality of strain gages rigidly attached to the trunnion member at the selected locations for measuring a strain of the trunnion member at the selected locations, each strain gage capable of transmitting a strain measurement signal;
 a decoder coupled to the strain gages and capable of receiving the strain measurement signal and converting the strain measurement signal to a digital signal representing the load placed on the truck trailer axle; and
 a display mechanism coupled to the decoder for displaying the digital signal to a user.

18. The weight measurement apparatus of claim 17 wherein the trunnion member is a double-ended shear beam pin load cell.

19. The weight measurement apparatus of claim 17 wherein the spring connection means includes threaded bolts for threadably coupling the leaf springs and the trunnion member.

20. The weight measurement apparatus of claim 17 wherein the trunnion connection means includes threaded bolts for threadably coupling the truck trailer and the trunnion member.

21. A truck for transporting a payload, comprising:
 a trailer adapted to retain the payload, the trailer having a frame;
 a suspension assembly having an axle with opposing ends, wheels attached to the opposing ends of the axle and first and second axle mounting members attached to the axle intermediate the wheels, the axle being capable of rotation relative to the mounting members;
 a trunnion member having a length selected to extend between the axle mounting members and removably connectable at a first trunnion member end to the first axle mounting member and at a second trunnion member end to the second mounting member, the trunnion member being removably connectable to the frame at first and second connection locations between the first and second trunnion member ends and having first and second load sensors for sensing the weight of the payload, the first load sensor being positioned proximate the first connection location, the second load sensor positioned proximate the second connection location;

a decoder coupled to the load sensor and capable of receiving a load signal from the load sensor and converting the load signal to a digital signal representing the weight of the trailer end and the payload; and a display mechanism coupled to the decoder for displaying the digital signal to a user.

22. The truck of claim 21, further comprising a tractor releasably attachable to the trailer for towing the trailer, the tractor retaining the display mechanism therein.

23. The truck of claim 21 wherein the axle mounting members include springs adapted to releasably retain the trunnion member.

24. The truck of claim 21 wherein the trunnion member is a double-ended shear beam pin load cell.

25. The truck of claim 21 wherein the trunnion member has stress concentration grooves for concentrating stress in selected locations of the trunnion member and the load sensor includes a plurality of strain gages rigidly attached to the trunnion member at the selected locations.

26. A method for determining the weight of a load borne by a trailer, the trailer having a trailer frame attached to a trunnion tube member, the trailer further having an axle retaining a plurality of wheels, the axle being attached to the trunnion tube member, the method comprising:

removing the trunnion tube member from the trailer;

connecting first and second end portions of a load-indicating trunnion member to one of the axle and the frame;

connecting first and second connection locations of the load-indicating trunnion member to the other of the axle and the frame, the first and second connection locations being between the first and second end portions of the load-indicating trunnion member, the load-indicating trunnion member having a first and second load sensors for calculating the weight of the load, the first load sensor being between the first end portion and the first connection location, the second load sensor being between the second end portion and the second connection location;

calculating the weight of the load from a signal generated by the load sensor; and displaying the weight of the load to a user.

27. The method of claim 26 wherein the step of calculating the weight of the load includes converting an analog signal received from the load sensor to a digital signal, calculating an empty weight of the trailer, and adding the empty weight to the weight of the load to calculate a total trailer weight.

28. A method for retro-fitting a truck trailer to include an onboard weight measurement system, the truck trailer having an existing trunnion tube member removably attached thereto and an axle retaining wheels thereon coupled to the trunnion tube member, the method comprising:

removing the trunnion tube member from the truck trailer;

coupling a load-indicating trunnion member to the axle and the truck trailer, the load-indicating trunnion member having a first stress concentration groove toward a first end thereof and a second stress concentration groove toward a second end thereof, each stress concentration groove having first and second spaced apart edges;

attaching a first load sensor to a first web of the load-indicating trunnion member such that the first load sensor is within the edges of the first stress concentration groove when viewed generally normal to the first stress concentration groove; and attaching a second load sensor to a second web of the load-indicating trunnion member between the edges of the second stress concentration groove such that the second load sensor is within the edges of the second stress concentration groove when viewed generally normal to the second stress concentration groove.

29. The method of claim 28 wherein the axle has a spring member attached thereto, the trunnion tube member being removably attached to the spring member of the axle, the step of coupling the load-indicating trunnion member to the axle including connecting the load-indicating trunnion member to the spring member of the axle.

30. A weight measurement apparatus for measuring the weight of a load borne by an axle, the axle having first and second end portions, the apparatus comprising a trunnion member having a length selected to extend between the first and second end portions of the axle and removably coupled at a first trunnion member portion to the first end portion of the axle and at a second trunnion member portion to the second end portion of the axle, the trunnion member being removably coupled to the load at first and second spaced apart connection locations of the trunnion member, the trunnion member having first and second web portions, the first web portion being between the first trunnion member portion and the first connection location, the second web portion being between the second trunnion member portion and the second connection location.

a first load sensor attached to the first web portion to sense a first portion of the weight of the load borne by the axle; and a second load sensor attached to the second web portion to sense a second portion of the weight of the load borne by the axle.

31. The weight measurement apparatus of claim 30 wherein the trunnion member has a first stress concentration groove positioned between the first connection location and the first trunnion member portion and coaxial with the first web portion for concentrating stress at the first web portion, the trunnion member further having a second stress concentration groove positioned between the second connection location and the second trunnion member and coaxial with the second web member for concentrating the stress at the second web portion.

32. The weight measurement apparatus of claim 31 wherein the first load sensor includes a first strain gage.

33. The weight measurement apparatus of claim 30 wherein the trunnion member is a double-ended shear beam pin load cell.

34. A weight measurement apparatus for measuring the weight of a load borne by an axle, the axle having first and second end portions, the apparatus comprising:

a trunnion member having a length selected to extend between the first and second end portions of the axle and removably coupled at a first trunnion member end to the first end portion and at a second trunnion member end to the second end portion, the trunnion member being removably coupled to the load at first and second connection locations positioned between the first and second end portions;

first load sensing means attached to the trunnion member between the first trunnion member end and the first connection location for measuring the weight of a first portion of the load borne by the trunnion member; and second load sensing means attached to the trunnion member between the second trunnion member end and the second connection location for measuring the weight of a second portion of the load borne by the trunnion member.

35. The weight measurement apparatus of claim 34 wherein the trunnion member has a stress concentration groove in an outer surface thereof and the first load sensing means includes a plurality of strain gages positioned on a web of the trunnion member such that each strain gage is positioned within opposite edges of the stress concentration groove when viewed generally normal to the stress concentration groove, each strain gage being capable of measuring a strain of the trunnion member and transmitting a strain measurement signal away therefrom.

* * * * *